H. D. NICHOLLS.
GRINDING AND SHARPENING MACHINE.
APPLICATION FILED FEB. 18, 1905.

907,862.

Patented Dec. 29, 1908.
5 SHEETS—SHEET 3.

Witnesses:

Inventor:
Henry D. Nicholls,
by his Attorneys
Howson & Howson

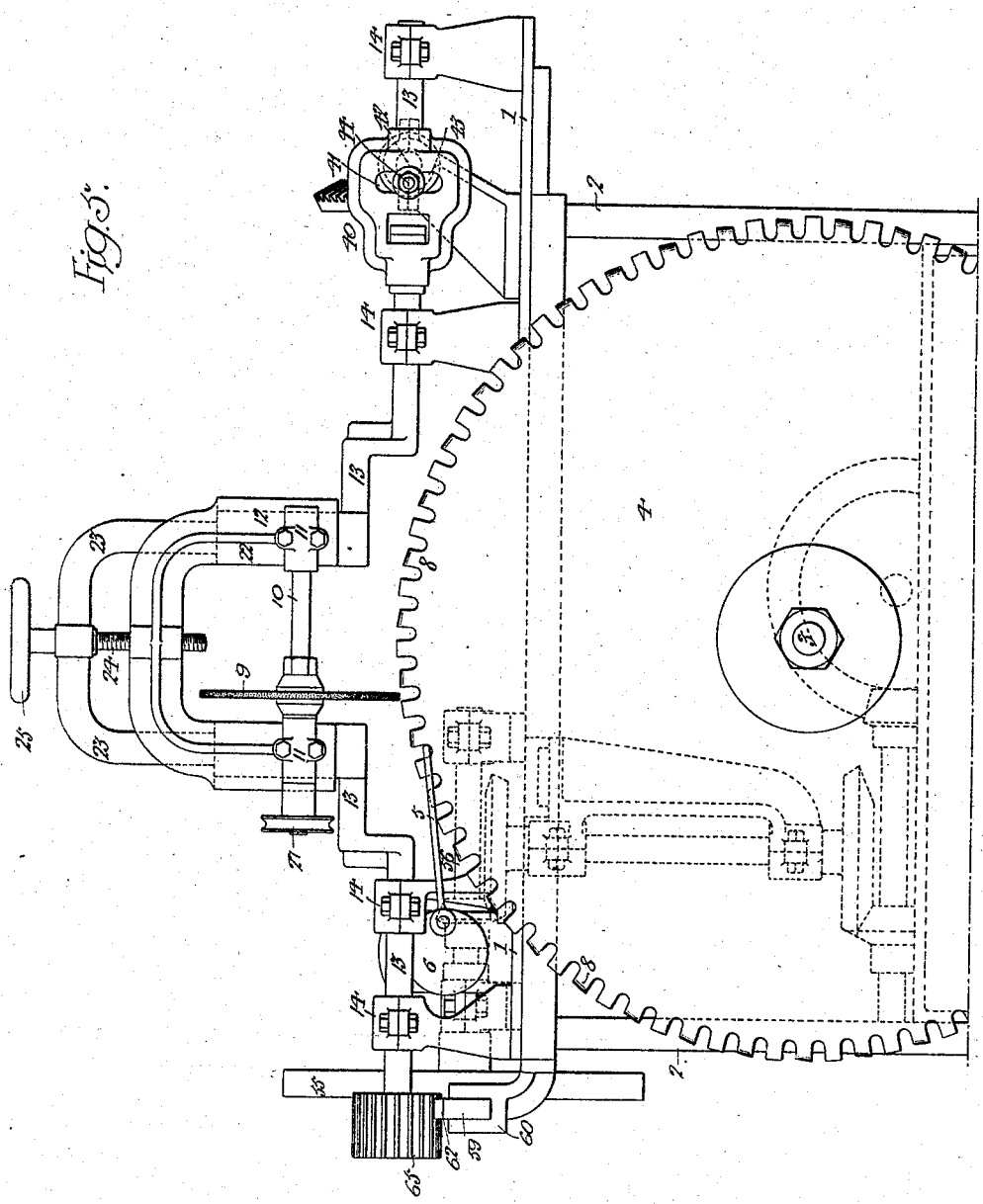

H. D. NICHOLLS.
GRINDING AND SHARPENING MACHINE.
APPLICATION FILED FEB. 18, 1905.
907,862.
Patented Dec. 29, 1908.
5 SHEETS—SHEET 5.
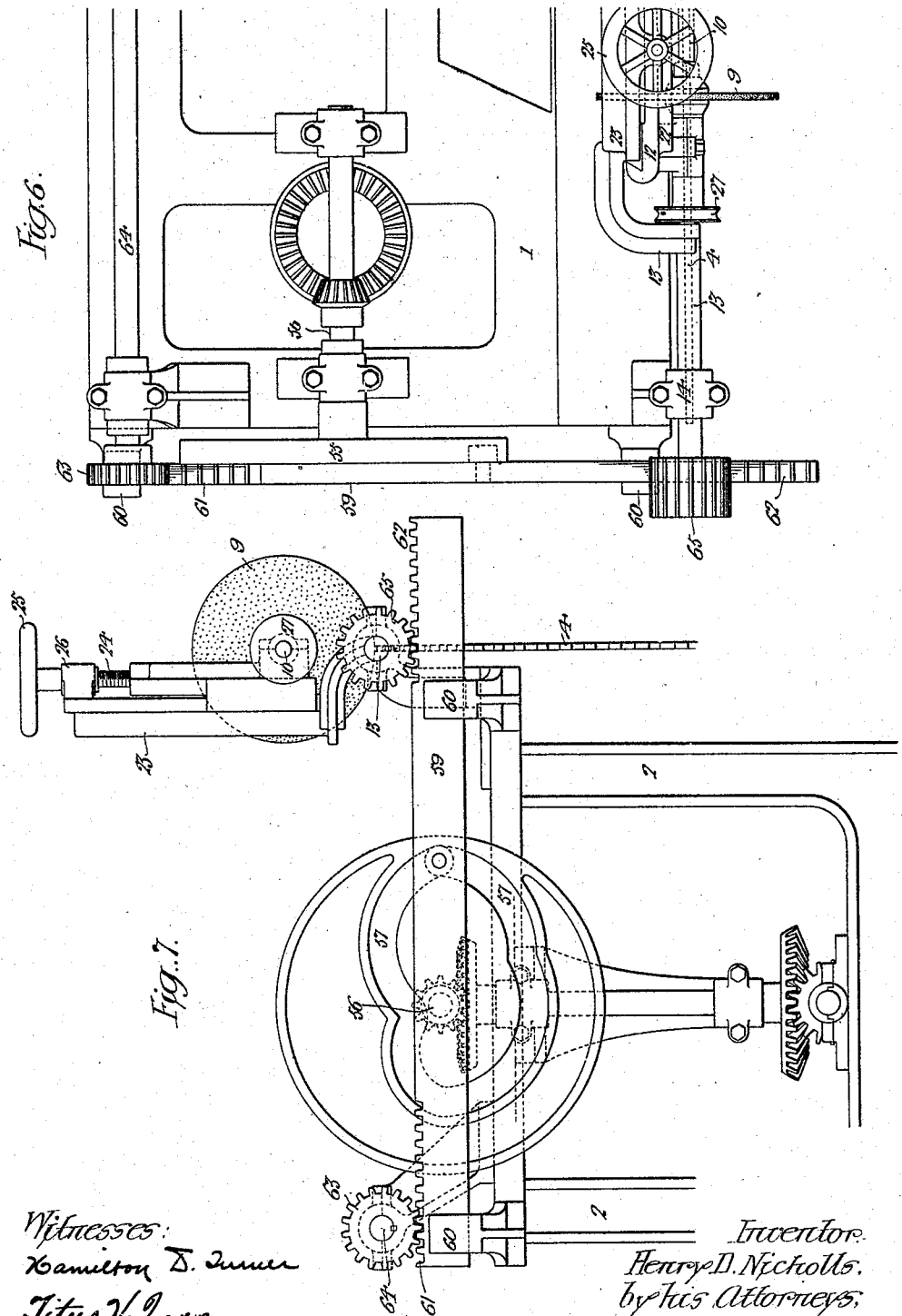

UNITED STATES PATENT OFFICE.

HENRY D. NICHOLLS, OF PHILADELPHIA, PENNSYLVANIA.

GRINDING AND SHARPENING MACHINE.

No. 907,862.      Specification of Letters Patent.      Patented Dec. 29, 1908.

Application filed February 18, 1905. Serial No. 246,244.

*To all whom it may concern:*

Be it known that I, HENRY D. NICHOLLS, a citizen of the United States, residing in Philadelphia, Pennsylvania, have invented certain improvements in Grinding and Sharpening Machines, of which the following is a specification.

My invention relates to grinding or sharpening machines, and consists of an improved apparatus of this general character designed for the purpose of rounding the teeth of metal cutting saws or milling tools.

Figure 1:
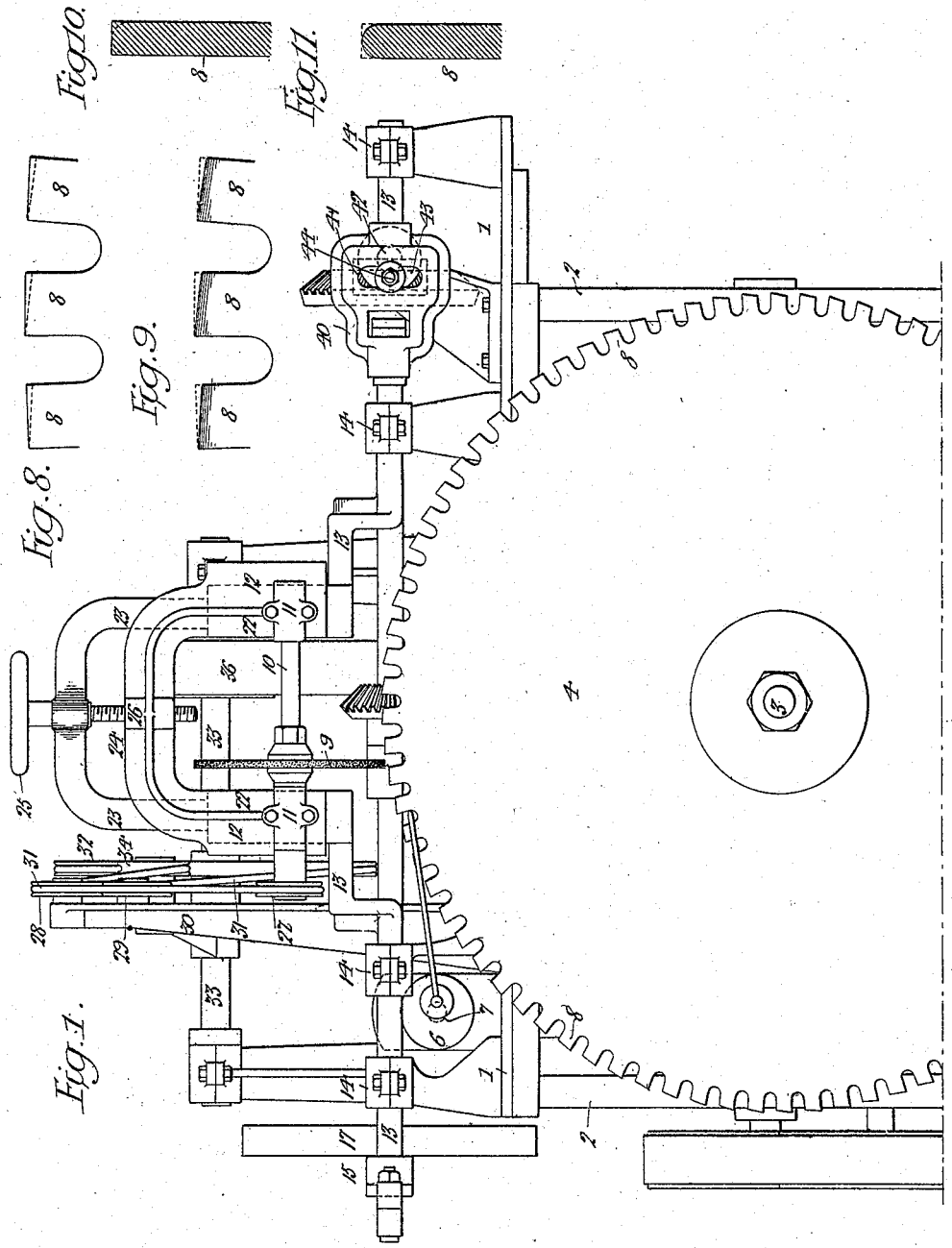
Figure 2:
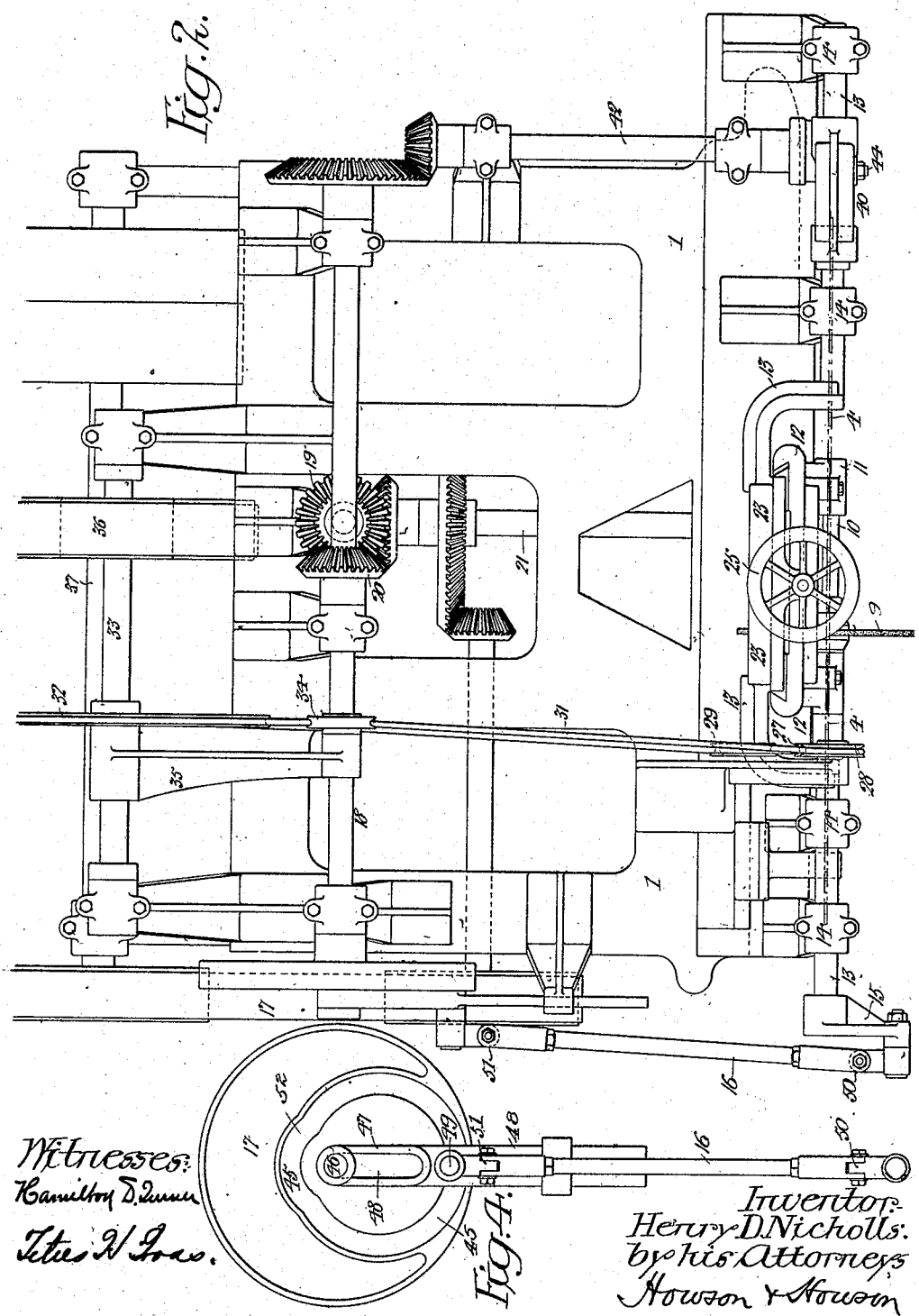
Figure 3:
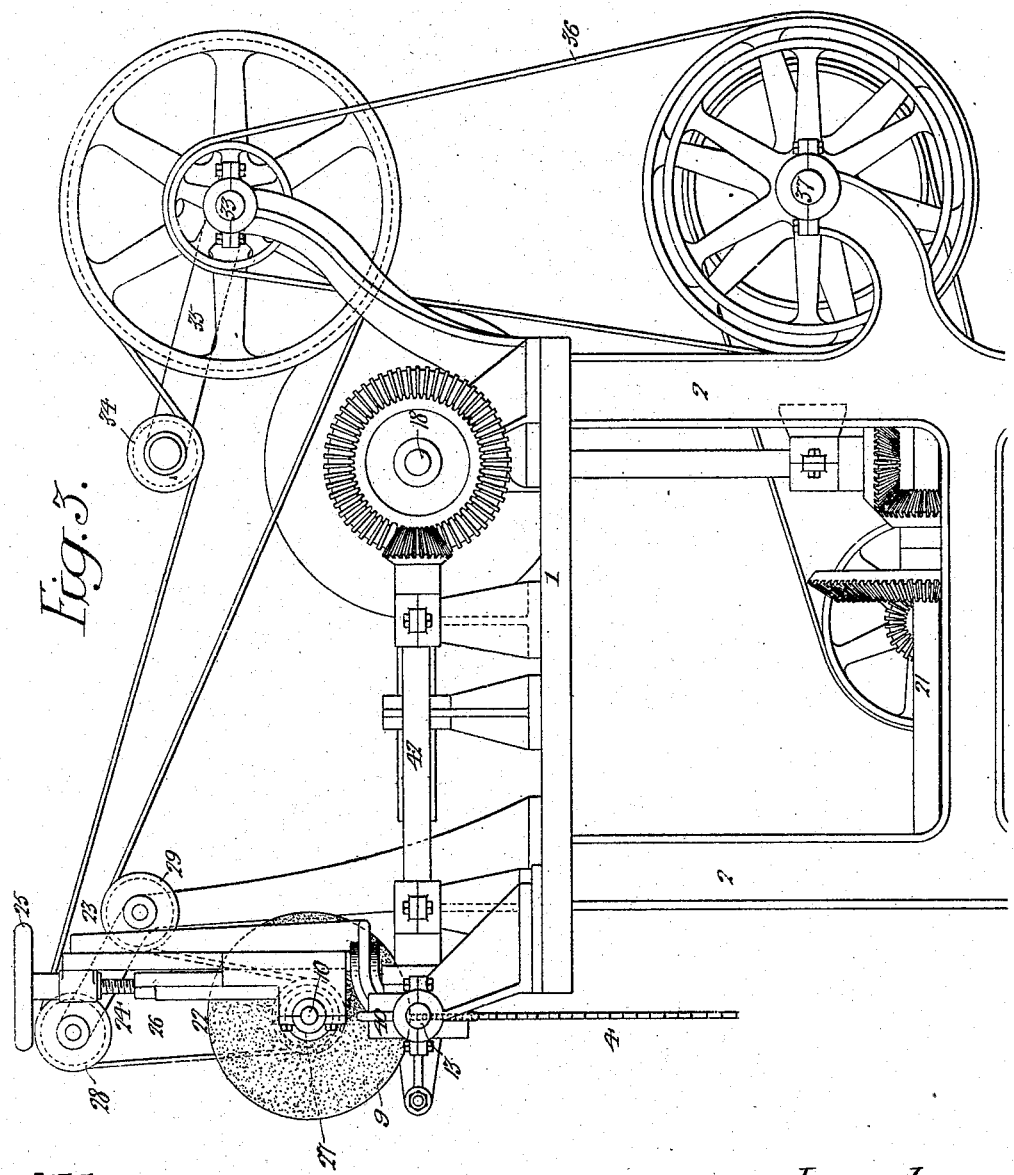

My invention is fully shown in the accompanying drawings, in which:

Figure 1, is a front elevation of a machine embodying my invention; Fig. 2, is a plan view of the same; Fig. 3, is an end view; Fig. 4, is a detached view illustrating a detail of my invention; Fig. 5, is a front elevation of a modified form of my improved machine; Fig. 6, is a plan view of part of the same; Fig. 7, is an end view of the same, and Figs. 8, 9, 10 and 11, are enlarged views of the teeth of the saw or cutter illustrating the manner in which the same are ground.

The machine forming the subject of my invention consists of a bed or base plate 1, supported by a suitable framework 2, and arranged to carry a shaft or spindle 3 upon which the rotary saw or cutter 4 is mounted. A finger 5 operated by suitable means, in the present instance being carried by a rotatable face plate 6 on the end of a driven shaft 7, is employed to move the saw or cutter a tooth at a time. This structure is commonly used in saw sharpening or grinding machines and forms no part of my invention.

The outer edge or surface of each tooth 8 of the saw is to be engaged by an emery wheel 9 carried by a shaft or spindle 10 mounted in adjustable bearings 11 and arranged to be moved from and toward said edge of the saw, so that during the grinding action its engagement therewith may change as the squared edge of the saw is reduced and gradually assumes a rounded contour. The frame 12 supporting the bearings of the emery wheel is carried by a cranked shaft or member 13 which is rocked or oscillated back and forth by suitable mechanism to be explained hereinafter, for the purpose of moving or oscillating the rotating emery wheel around the entire edge of the saw, from a position on one of the same with the cranked shaft at right angles to the face of the saw, to a position on the opposite side of the same with the cranked shaft in the same relative position. In addition to this movement imparted to the emery wheel carrier, the latter is also reciprocated by movement imparted to the cranked shaft as the emery wheel is revolving so that the saw teeth are engaged from end to end of the same, and when finished said teeth have a rounded face or edge that is beveled from the point to the heel of the tooth, on a line tangent to the arc of a circle struck from the center of the saw, the emery wheel being set to one side of the center of rotation of the saw.

It will be understood that I may impart to the top or cutting edge of the tooth any desired curvature by moving the grinding wheel with respect to the saw or by moving the saw with respect to the grinding wheel. For this latter purpose the support for the saw may be adjustable so that the edge of said saw can be moved from and towards the center of oscillation of the grinding wheel; it being necessary, of course, that the center of the arc of curvature of the tooth shall be coincident with the center of oscillation of the grinding wheel.

The cranked shaft or member 13 is mounted in bearings 14 in which it may be reciprocated. This shaft 13 carries at one end a cranked arm 15 operatively connected by means of a suitable rod 16, with an eccentric or cam 17 mounted on a shaft 18 and driven by the gearing 19 and 20, from the main driving shaft 21 of the machine. By this means the cranked shaft 13 will be rocked or oscillated back and forth and the emery wheel carried by the frame mounted on said cranked member or shaft will be caused to engage the edge of the saw during such rocking or reciprocation and reduce said edge from one having a square section to one having a semi-circular contour.

The frame 12 supporting the shaft or spindle 10 on which the emery wheel is mounted is arranged to slide on ways 22 formed on the extension 23 of said shaft, and adjustment of these parts to regulate the position of the emery wheel with respect to the saw or cutter is provided for by means of a screw 24, operated by means of a hand wheel 25. This screw is suitably anchored in the portion 23 of the cranked shaft 13 and engages a threaded part 26 formed in the frame carrying the emery wheel. By this means the emery wheel may be adjusted from and towards the work. The center line of the journaled portions of the cranked shaft is in line with the center of the saw and of the curvature to be imparted to the teeth by the grinding action, and means are preferably provided to limit the downward movement of the emery wheel so that it will finish the teeth uniformly. This stop member should be adjustable so that wear of the emery wheel may be compensated for.

To drive the emery wheel, its shaft is provided with a pulley 27, and pulleys 28 and 29 are carried by the frame 30. To drive these pulleys a band or cord 31 is employed which passes from a driven pulley 32 mounted on a shaft 33 around said pulleys 27, 28 and 29. An idler pulley 34 is employed, carried by an arm 35 mounted on the shaft 33 and loose thereon so as to take up any slack in the band or cord 31. The shaft 33 is driven by a belt 36 from a shaft 37.

The shaft 10 is reciprocable in its bearings during the rocking or oscillating movement, and the reciprocation is accomplished by the following means. At the end of the shaft opposite the crank arm 12, an enlarged member 40 is mounted having a slot 41. Mounted in bearings on the bed plate of the machine at right angles to the shaft 13, is a shaft 42 carrying a face plate 43 having a pin 44 entering the slot 41 and engaging the walls of the same. As this shaft 42 is rotated, the face plate is rotated with it and the pin engaging the walls of the slot moves the cranked shaft 13 back and forth in its bearings. By this means the emery wheel is traversed back and forth along each tooth simultaneously with its rotation, and as it is carried back and forth by the rocking or oscillation of the cranked shaft 13. The rocking or oscillation of this shaft 13 is caused by the rod connection 16 engaging the crank arm 15 mounted on the end of the shaft 10. Carried by the shaft 18 is the cam plate 17 having a groove 45 in its face. The center of this cam plate is provided with a pin 46, and an arm 47 having a slot 48 engaged by this pin, is carried by the rod 16, the latter having a pin 49 with an anti-friction roller engaging the cam slot or groove 45. As the cam plate rotates, the rod 16 is drawn back and forth and being connected to the crank arm 15 it rocks or oscillates the cranked shaft 13, the connection being of such character as to prevent rotation of said shaft 13. The rod is pivoted or hinged at 50 and 51 to the crank arm 15 and plate or arm 47, so as to yield during the reciprocal movements of the said shaft. The arm or plate 47 acts to guide the rod 16 as the cam plate is revolved. The cam groove is provided with an offset portion 52 which serves to stop the rocking or oscillating movement of the cranked shaft for a length of time sufficient to permit the feeding of the saw one tooth at a time for the engagement of the emery wheel upon a fresh part. The saw is fed continuously one tooth for every revolution of the cam 17 and the grinding action takes place very gradually, such saw making probably twenty or more revolutions before the teeth are rounded to the extent desired. When finished the teeth will also be beveled from point to heel as clearly shown in the drawings, a condition due to the off-setting of the center of the saw with respect to the emery wheel.

The machine just described is one designed for rounding each tooth of a circular milling saw or cutter, and such teeth are gradually rounded by rotating such saw continuously in such position as to be engaged by the emery or other sharpening wheel. There are, however, other types of milling saws or cutters, notably one in which every other tooth is left plain or square so that in making a cut by the use of a saw of this character, the rounded portion of the kerf made by the rounded teeth will be cleaned out by the square cutting edges or corners of the square teeth. For the purpose, therefore, of rounding the alternate teeth of such a saw as this, I provide the mechanism clearly shown in Figs. 5, 6 and 7, in which means are provided for bringing the emery wheel frame into a vertical position so that the feeding mechanism designed to move the saw by engagement with the teeth will be able to effect such movement two teeth at a time, with the emery or other sharpening wheel in such position with respect to the saw that it will not act upon the squared edge. This movement may only take place when the emery wheel is directly above the teeth, for in such position there will always be sufficient clearance between such cutter and the teeth it is not desired to round.

In Figs. 5, 6 and 7, I employ a cam 55, mounted on a shaft 56, and having a cam groove 57, which is engaged by a roller 58, mounted on a slide 59, adapted to and supported by a pair of brackets 60. This slide bar is provided with racked portions 61 and 62 at opposite ends, the rack 61 meshing with a pinion 63 on a shaft 64, while the rack 62 meshes with a wide face pinion 65, carried by the rocker or crank shaft 13. The grooves of the cam are so proportioned and disposed as to operate the emery wheel in order to bring the latter into engagement with the saw teeth and effect the rounding of the same, and is further provided with a portion which will cause such frame and the rocker or crank shaft to pause in a vertical position for a length of time sufficient to move the saw the distance of two teeth so that the emery wheel may always engage the proper teeth to be rounded, the alternate teeth being left in the original rectangular condition. The shaft 64 is connected (by means not shown) to the shaft for operating the face plate to reciprocate the cranked shaft 13. In this form of the machine, the pusher arm and the eccentric for operating the same will be arranged to move two teeth instead of one, the eccentric being proportionately larger to effect this movement. In all other respects, the machine is exactly like that shown in Figs. 1, 2, 3 and 4, and the operation of grinding or sharpening the teeth is the same; the teeth to be rounded being gradually reduced from their square shape to semi-circular shape, such reduction or grinding being made as the saw is rotated, and in general, I have found that the complete rounding, beveling and change of shape of the teeth may be accomplished in twenty or twenty-one complete revolutions of the saw.

The machine may be driven in any suitable manner by belts from a suitable source of power, and the driving mechanism for operating the emery wheel is independent of the mechanism for operating the cranked shaft, both in its rocking or oscillating movements and its reciprocated movements.

Having thus described my invention, I claim and desire to secure by Letters Patent:

1. In a grinding or sharpening machine, the combination of means for supporting the work, a grinding wheel mounted for rotation, a support for said wheel mounted in fixed bearings, a cranked shaft carrying said support, and means for giving said cranked shaft a rocking or oscillating movement to cause the grinding wheel to engage the work in the arc of a circle struck from the center of oscillation.

2. In a grinding or sharpening machine, the combination of a mount for the work upon which it may be rotated, a grinding wheel for engagement therewith suitably mounted for rotation, a support for said wheel mounted in fixed bearings, means for giving said support a rocking or oscillating movement to cause the grinding wheel to engage the work in the arc of a circle struck from the center of oscillation, and means for reciprocating said grinding wheel laterally during such movement.

3. In a grinding or sharpening machine, the combination of a mount for the work upon which it may be rotated, means for moving the same intermittently, a grinding wheel mounted for rotation, means for rocking or oscillating said grinding wheel whereby its cutting face is caused to engage the work in the arc of a circle struck from the center of oscillation, and means for reciprocating said grinding wheel laterally during such movement.

4. In a grinding or sharpening machine, the combination of a mount for the work upon which it may be rotated, a cranked member mounted in suitable bearings, an adjustable frame carried by said cranked member, a grinding wheel mounted for rotation and supported by said frame, means for driving said wheel, means for oscillating the cranked member to cause said wheel to engage the work in the arc of a circle struck from the center of oscillation, and means for imparting a reciprocative movement to said cranked member whereby the grinding wheel may be moved laterally across the face of the work during the rotating and oscillating movements of the same.

5. In a grinding or sharpening machine, the combination of means for supporting the work to be operated upon, a grinding wheel mounted for rotation and arranged to engage said work, an adjustable frame supporting said grinding wheel, a cranked member to which said frame is secured, means for driving the grinding wheel, means for reciprocating the cranked shaft in its bearings whereby lateral movement is imparted to the grinding wheel, and independent means for imparting a rocking or oscillating movement to the cranked member in the arc of a circle struck from the center of the same whereby the grinding wheel is caused to engage the work in the same arc.

6. In a grinding or sharpening machine, the combination of means for supporting the work to be operated upon, a grinding wheel mounted for rotation and arranged to engage said work, a cranked shaft supporting said grinding wheel, a cranked arm carried by one end of said shaft, and a cam connected to said cranked arm whereby a rocking or oscillating movement may be imparted to the cranked shaft in the arc of a circle struck from the center of oscillation.

7. In a grinding or sharpening machine, the combination of means for supporting the work to be operated upon, a grinding wheel mounted for rotation and arranged to engage said work, a cranked shaft supporting said grinding wheel, means for rocking or oscillating said cranked shaft whereby the grinding wheel is caused to engage the work in the arc of a circle struck from the center of oscillation, and means for reciprocating said shaft during its rocking movements.

8. In a grinding or sharpening machine, the combination of means for supporting the work to be operated upon, a grinding wheel mounted for rotation and arranged to engage said work, a cranked shaft supporting said grinding wheel, means for rocking or oscillating said cranked shaft whereby the grinding wheel is caused to engage the work in the arc of a circle struck from the center of oscillation, a slotted member carried by one end of the cranked shaft, a shaft mounted at right angles to the cranked shaft, a face plate carried by said shaft, and a pin on said faceplate engaging the slotted member whereby said cranked shaft may be reciprocated in its bearings.

9. In a grinding or sharpening machine, the combination of means for supporting the work to be operated upon, a grinding wheel mounted for rotation and arranged to engage said work, a cranked shaft supporting said grinding wheel, a cranked arm carried by one end of said shaft, a cam connected to said cranked arm whereby a rocking or oscillating movement may be imparted to the cranked shaft in the arc of a circle struck from the center of oscillation, a slotted member carried by the opposite end of the cranked shaft, a shaft mounted at right angles to the cranked shaft, a face-plate carried by said shaft, and a pin on said face-plate engaging the slotted member whereby said cranked shaft may be reciprocated in its bearings.

10. In a grinding or sharpening machine, the combination of means for supporting the work to be operated upon, a grinding wheel mounted for rotation and arranged to engage said work, a cranked shaft supporting said grinding wheel, a cranked arm carried by one end of said shaft, a driving shaft, a grooved cam-plate carried by the end of said shaft, and a rod carried by the cranked arm and engaging the groove of the cam, the connection being such as to provide for the rocking or oscillation of the cranked shaft in the arc of a circle struck from the center of oscillation, said groove being so shaped as to provide for intermittent stoppages of the cranked shaft to permit feeding of the work.

11. In a grinding or sharpening machine, the combination of means for supporting the work to be operated upon, a grinding wheel mounted for rotation and arranged to engage said work, a cranked shaft, a frame mounted on said cranked shaft, bearings carried thereby for the grinding wheel, and means for adjusting said frame whereby the grinding wheel may be moved towards and from the work.

12. In a grinding or sharpening machine, the combination of means for supporting the work, a grinding wheel mounted for rotation, a support for said wheel mounted in fixed bearings, means for giving said grinding wheel a rocking or oscillating movement in the arc of a circle struck from the center of oscillation, means for imparting a step by step movement to the work, and means co-acting with the other mechanism for disposing the grinding wheel in convenient position with respect to the work to permit such movement.

13. In a grinding or sharpening machine, the combination of a mount for the work upon which it may be rotated, a grinding wheel, means for rotating said grinding wheel, means for giving said wheel a rocking or oscillating movement in engagement with the work in the arc of a circle struck from the center of oscillation, means for moving the work, and means for halting the grinding wheel in a vertical position over said work to permit such movement.

In testimony whereof, I have signed my name to this specification, in the presence of two subscribing witnesses.

HENRY D. NICHOLLS.

Witnesses:
MURRAY C. BOYER,
JOS. H. KLEIN.